(12) United States Patent
Bourderionnet et al.

(10) Patent No.: US 10,979,149 B2
(45) Date of Patent: Apr. 13, 2021

(54) DEVICE AND SYSTEM FOR COHERENTLY RECOMBINING MULTI-WAVELENGTH OPTICAL BEAMS

(71) Applicant: THALES, Courbevoie (FR)

(72) Inventors: Jérôme Bourderionnet, Palaiseau (FR); Arnaud Brignon, Palaiseau (FR); Arnaud Le Kernec, Palaiseau (FR); Michel Sotom, Palaiseau (FR); Anaëlle Maho, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/706,503

(22) Filed: Dec. 6, 2019

(65) Prior Publication Data
US 2020/0195355 A1    Jun. 18, 2020

(30) Foreign Application Priority Data
Dec. 18, 2018 (FR) ...................................... 1872955

(51) Int. Cl.
| | | |
|---|---|---|
| H04B 10/61 | (2013.01) |
| H04B 10/11 | (2013.01) |
| H04B 10/2513 | (2013.01) |
| H04B 10/2581 | (2013.01) |
| H04J 14/02 | (2006.01) |

(52) U.S. Cl.
CPC ......... *H04B 10/6165* (2013.01); *H04B 10/11* (2013.01); *H04B 10/2513* (2013.01); *H04B 10/2581* (2013.01); *H04B 10/61* (2013.01); *H04J 14/0205* (2013.01)

(58) Field of Classification Search
None
See application file for complete search history.

(56) References Cited

U.S. PATENT DOCUMENTS

| | | | |
|---|---|---|---|
| 6,650,458 B1* | 11/2003 | Prosyk | G02F 1/225 359/237 |
| 7,974,543 B2* | 7/2011 | Khurgin | H04B 10/61 398/212 |
| 10,056,733 B1* | 8/2018 | Taylor | G02B 6/12004 |
| 2004/0008916 A1* | 1/2004 | Ridgway | H04B 10/2572 385/2 |

(Continued)

FOREIGN PATENT DOCUMENTS

WO    2017/162853 A1    9/2017

*Primary Examiner* — Tanya T Motsinger
(74) *Attorney, Agent, or Firm* — BakerHostetler

(57) ABSTRACT

An elementary device for coherently recombining a first elementary beam and a second elementary beam, includes a first input and a second input, into which are respectively injected the first elementary beam and the second elementary beam to be recombined, an output that delivers an output beam corresponding to the coherent recombination of the first and second elementary beams, a delay line placed on one of the paths of said elementary beams and configured to induce a variable delay on said path, a variable coupler comprising a first 2×2 combiner, a phase modulator and a second 2×2 combiner, a control detector configured to generate, from the complementary beam, an error signal (ε), a feedback loop configured to determine, from the error signal, the delay and the phase difference to be applied.

9 Claims, 10 Drawing Sheets

(56) References Cited

U.S. PATENT DOCUMENTS

| | | | |
|---|---|---|---|
| 2005/0171438 A1* | 8/2005 | Chen | A61B 5/7203 600/476 |
| 2008/0239465 A1* | 10/2008 | Hasegawa | H04B 10/677 359/325 |
| 2009/0279902 A1* | 11/2009 | Granot | H04B 10/677 398/208 |
| 2010/0054761 A1* | 3/2010 | Chen | H04B 10/60 398/212 |
| 2012/0106984 A1* | 5/2012 | Jones | H04J 14/06 398/214 |
| 2016/0146869 A1* | 5/2016 | Marsland, Jr. | G01J 1/44 324/76.77 |
| 2018/0034555 A1* | 2/2018 | Goh | G02B 6/29355 |
| 2018/0059332 A1* | 3/2018 | Mansouri Rad | G02B 6/12004 |
| 2018/0074386 A1* | 3/2018 | Chung | G02F 1/3136 |
| 2019/0013878 A1* | 1/2019 | Paraiso | H04B 10/70 |
| 2019/0028200 A1* | 1/2019 | Ferreira | H04B 10/6163 |
| 2019/0196097 A1* | 6/2019 | Takechi | G02B 6/12004 |
| 2020/0200975 A1* | 6/2020 | Ma | G02F 1/011 |

* cited by examiner

DEVICE AND SYSTEM FOR COHERENTLY RECOMBINING MULTI-WAVELENGTH OPTICAL BEAMS

CROSS-REFERENCE TO RELATED APPLICATIONS

This application claims priority to foreign French patent application No. FR 1872955, filed on Dec. 18, 2018, the disclosure of which is incorporated by reference in its entirety.

FIELD OF THE INVENTION

The invention relates to the field of optical communication via a spatially multimode propagation channel. This is in particular encountered in free space, where the phase front of the wave vector of the information is distorted to a greater or lesser extent as it passes through any encountered perturbed media, such as atmospheric layers in an earth-satellite link. According to another example, coupling between spatial modes during propagation through multimode fibres causes the beam to distort.

More precisely, the invention relates to a device and system for receiving and where appropriate receiving/emitting based on coherent recombination (and where appropriate splitting) of multi-wavelength optical beams.

BACKGROUND

The problem to be solved, when the phase front of an optical beam bearing information is distorted by a trip through free space, is to maintain an optimal link budget despite these distortions.

A first solution is to use adaptive optics (e.g. a deformable mirror) to compensate for the distortion of the optical wavefront and typically to optimize the optical injection into a single-mode fibre connected to the detector. This approach has the advantage of processing the pupil in its entirety, and allows both the emission (pre-compensation) and reception case to be treated, and of being wide band (WDM application possible). In contrast, the speed of adaptive optical loops is limited (ms in the best of cases) and can prove to be insufficient for atmospheric distortions of bandwidth of about or higher than 1 kHz.

A second solution consists in using a multi-aperture telescope, in an architecture that is said to have spatial diversity. Each "sub-telescope" receives one portion of the incident beam, and the principle of the method is to assume that the spatial diversity will make it possible to avert spatial extinctions due to interference (speckle). Whatever the turbulence, at least one sub-telescope will collect a non-zero signal. The signals delivered to the detectors placed downstream of each telescope are electrically summed (incoherently). The main drawback of this method is that it requires as many detectors as sub-telescopes, the noise of each detector being summed. Furthermore, this method does not allow the signal-to-noise ratio of the link to be improved.

In a third solution, described in document U.S. Pat. No. 7,974,543, it is proposed to use a receiving system based on the coherent recombination of modes/elementary beams. The system comprises a matrix array of micro-lenses for sampling the incident beam, said matrix array being coupled to a coherently recombining device 10, which is presented with $2^M$ beams to be recombined and which consists of a plurality of elementary 2×1 recombining devices arranged in cascade, such as illustrated in FIG. 1. Each elementary device consists of two inputs, 1 and 2 or 3 and 4 for example, corresponding to 2 beams to be re-combined, of a phase shifter 16 placed on the path of one of the beams, and of a 2×2 coupler 11 an output 12 of which is detected by a detector 13. The signal detected by 13 is minimized using electronics 15 (15a, 15b . . . ) allowing the phase shifter 16 (16a, 16b . . . ) to apply a phase shift to the beam 2 so that constructive interference occurs on the second output 17 of the coupler 11.

The final output 18 combines into a single beam all of the $2^M$ initial beams. A maximum signal 18 is sought.

One limitation of this type of system is the need to use a phase shifter (component 16), which limits the width of the spectral band of the incident beam that the system is able to process, as illustrated in FIG. 2. Furthermore, the use of a single element does not allow both the amplitudes and the phases of the two signals to be recombined to be equalized, with regard to obtaining an optimal effectiveness.

In FIG. 2 the following situation is considered: a field $E_0$ is emitted from a point source S, and follows 2 different paths T1 and T2 to reach a detector D. The first path T1 has a length $L_1$, and the second path T2 has a length $L_2$. To simplify, the medium separating the source S from the detector D is assumed to be non-dispersive, i.e. its refractive index is assumed to not depend on wavelength. Also for the sake of simplicity, it is assumed that the 2 paths have the same attenuation, and therefore that the fields incident on the detector will have the same intensity, independently of whether they have followed the path T1 or the path T2. The expression for the field at the detector is therefore:

$$E_{DET} = E_{trajet1} + E_{trajet2}$$

$$E_{DET} = E_0(t-\tau_1) + E_0(t-\tau_2)$$

where $\tau_1$ and $\tau_2$ are the times taken by the light to travel the paths T1 and T2, respectively, namely:

$$\tau_{1(or\,2)} = \frac{n \times L_{1(or\,2)}}{c}$$

The case where $E_0$ has a certain spectral content (for example modulation sidebands, or indeed the case where $E_0$ consists of a WDM frequency comb) will now be considered. The component of the spectrum of the electrical signal output from the detector at a frequency $\omega$ is therefore:

$$i_{DET}(\omega) = [E_0(\omega, t-\tau_1) + E_0(\omega, t-\tau_2)] \times c.c.$$

$$= [\widetilde{E_0} e^{-i\omega(t-\tau_1)} + \widetilde{E_0} e^{-i\omega(t-\tau_2)}] \times c.c$$

$$= 2\widetilde{E_0} \widetilde{E_0}^* \times \left(1 + \frac{\cos\omega(\tau_1 - \tau_2)}{2}\right)$$

It is now assumed that there is a means for controlling the optical phase difference between the fields issued from paths 1 and 2 (such as the phase shifter 16 of the aforementioned document). The field on the detector may therefore be written:

$$E_{DET} = E_0(t-\tau_1) \times e^{-i\varphi} + E_0(t-\tau_2)$$

where $\varphi$ is adjustable, with the aim of maximising the received signal. The signal $i_{DET}$ at the frequency $\omega$ is now equal to:

$$i_{DET}(\omega) = [\widetilde{E_0}e^{-i[\omega(t-\tau_1)+\varphi]} + \widetilde{E_0}e^{-i\omega(t-\tau_2)}] \times c.c.$$

$$= 2\widetilde{E_0}\widetilde{E_0}^* \times \left(1 + \frac{\cos[\omega(\tau_1-\tau_2)+\varphi]}{2}\right)$$

To maximize the received signal the following condition must be met:

$$\cos[\omega(\tau_1-\tau_2)+\varphi]=1$$

namely $$\varphi=\omega(\tau_2-\tau_1)+k2\pi$$

It may therefore be seen that this condition depends on the frequency ω in question, and that it is only applicable in the close vicinity of this frequency, for applications in particular to a single optical carrier (no WDM). Typically, for phase modulators there is an excursion of 1 to 2×λ with components that are typically millimetre-sized and materials the index variation of which is about of the order of $10^{-3}$, corresponding to phase shifts of about one micron.

In addition, in the case of an emitting/receiving architecture, the lasers of the emitting and receiving systems are required to have similar but not identical frequencies (typically a few nm of difference), this possibly being a significant drawback in the case of a system located on-board a satellite for example, or to tackle ageing of the laser diodes.

SUMMARY OF THE INVENTION

One aim of the present invention is to mitigate the aforementioned drawbacks by providing an elementary recombining device allowing coherent wide-spectral-band recombination to be achieved, and thus allowing a wideband receiving system (and where appropriate a receiving/emitting system) compatible with a WDM architecture to be implemented.

One subject of the present invention is an elementary device for coherently recombining a first elementary beam and a second elementary beam that are obtained by sampling an incident beam having undergone a distortion and the spectrum of which comprises M wavelengths each forming a channel for conveying information, said distortion having induced a delay between said first and second elementary beams, the elementary device comprising:
a first input and a second input, into which are respectively injected the first elementary beam and the second elementary beam to be recombined,
an output that delivers an output beam corresponding to the coherent recombination of the first and second elementary beams,
a delay line placed on one of the paths of said elementary beams and configured to induce a variable delay on said path,
a variable coupler comprising a first 2×2 combiner, a phase modulator and a second 2×2 combiner,
the second combiner having a main output that forms the output of the elementary device and that delivers said output beam and a complementary output that delivers a beam that is complementary to the output beam,
a control detector connected to the complementary output and configured to generate, from the complementary beam, an error signal that decreases to zero when the phase modulator is configured to apply a phase difference that equalizes the intensities of the first and second elementary beams, and when the delay line is configured to apply a delay that compensates for said delay between said first and second elementary beams,
a feedback loop configured to determine, from the error signal, the delay and the phase difference to be applied.

According to another aspect, the invention relates to a device for coherently recombining N elementary beams obtained by sampling said distorted beam, where N is a strictly positive even integer, comprising a plurality of elementary devices according to the invention arranged in cascade so as to obtain a single recombined beam.

According to yet another aspect, the invention relates to a receiving system comprising:
a device for spatially demultiplexing the incident beam, configured to sample said incident beam into N elementary beams,
a device for coherently recombining the N elementary beams according to the invention,
a device for wavelength demultiplexing so as to form M beams that M wavelengths each forming one channel for conveying information,
M detectors associated with said M beams.

According to one embodiment of the receiving system according to invention, the elementary beams are diffraction limited.

According to one embodiment, the spatially demultiplexing device comprises a matrix array of micro-lenses that is configured to spatially sample the incident beam.

According to another embodiment, the spatially demultiplexing device comprises a multi-aperture telescope.

According to another embodiment, the spatially demultiplexing device comprises N phase plates configured to carry out a decomposition into N spatial modes.

According to another aspect, the invention relates to a receiving/emitting system comprising a receiving system according to the invention and an emitting system, comprising:
M laser sources and M associated modulators, configured to generate M beams at M wavelengths,
a device for wavelength multiplexing so as to form a multi-wavelength beam,
a device for coherently splitting the multi-wavelength beam into N elementary emission beams, which is substantially identical to the coherently recombining device according to the invention, but used in the inverse direction and so that each delay line and each phase modulator respectively applies the opposite delay and the opposite phase difference to those determined by each feedback loop of the coherently recombining device of the receiving system, so that the N elementary emission beams respectively correspond to N beams that are the conjugates of the N initial elementary beams,
a spatially multiplexing device that is substantially identical to the spatially demultiplexing device but used in inverse direction so as to convert the N elementary emission beams into an emitted beam corresponding to the conjugate of the incident beam, so as to pre-compensate for said distortion.

According to one embodiment of the receiving/emitting system, the coherently recombining device and the coherently splitting device are one and the same, the spatially demultiplexing device and the spatially multiplexing device are one and the same, the wavelength demultiplexing device and the M detectors on the one hand, and the M laser sources, the M associated modulators and the wavelength multiplexing device on the other hand, are coupled to the coherently recombining/splitting device by a circulator, and the system is furthermore configured to be used to alternately receive and emit.

The following description presents a plurality of examples of embodiments of the device of the invention: these examples do not limit the scope of the invention. These examples of embodiments have both features essential to the invention and additional features related to the embodiments in question.

BRIEF DESCRIPTION OF THE DRAWINGS

The invention will be better understood and other features, aims and advantages thereof will become apparent from the following detailed description and with reference to the appended figures, which are given by way of nonlimiting examples and in which.

For the sake of clarity, elements that are the same have been referenced with the same references in all the figures.

DETAILED DESCRIPTION

Figure 3:
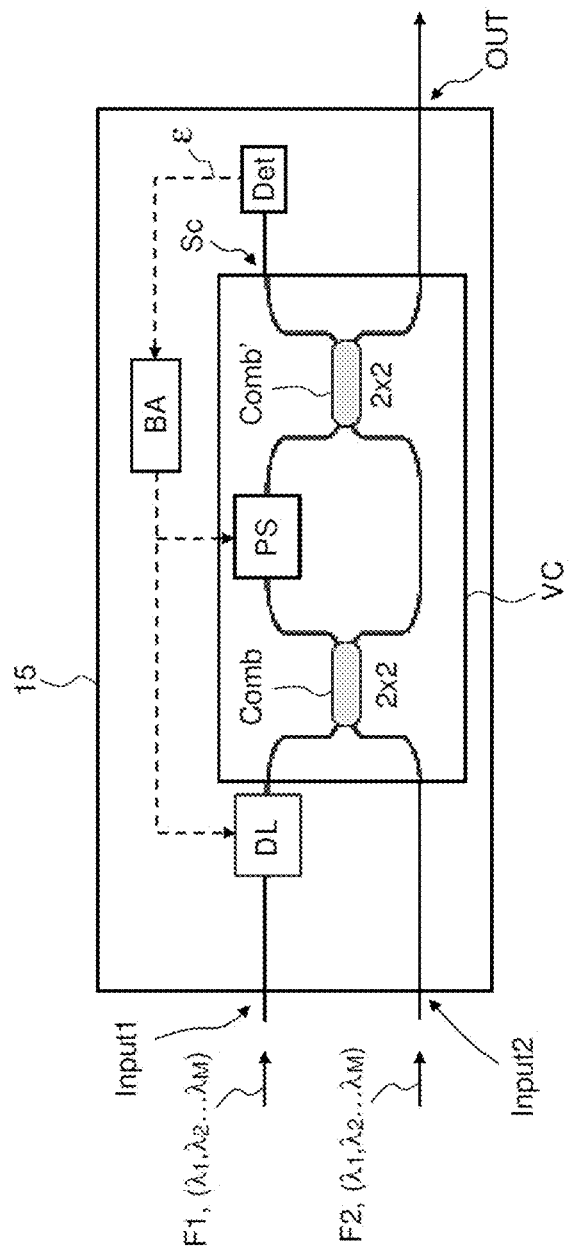
FIG. 3 illustrates an elementary coherently recombining device according to the invention.

The elementary coherently recombining device 15 according to the invention is illustrated in FIG. 3.

It recombines a first elementary beam F1 and a second elementary beam F2 that are obtained by sampling an incident beam Fid having undergone a distortion, typically on free-space propagation through layers of the atmosphere, or on passage through a multimode fibre with a low degree of depolarization. Because of the distortion, the beams F1 and F2 have a different amplitude and a different phase.

Let $I_o$ be the intensity of the incident beam Fid, I1 the intensity of F1 and I2 the intensity of F2, with $I1=\rho1 \cdot I_0$ and $I2=\rho2 \cdot I_0$.

The spectrum of Fid is wide (frequency comb or band) and comprises at least M wavelengths $\lambda_1, \lambda_2, \ldots \lambda_M$ (M being at least equal to 2) each forming a channel conveying information (WDM architecture for example).

The elementary device 15 according to the invention has an architecture of the same type as that described in document U.S. Pat. No. 7,974,543 but with two equalization levels. It comprises a first input Input1 and a second input Input2 into which are respectively injected F1 and F2 to be recombined and an output Out delivering an output beam corresponding to the coherent recombination of the first and second elementary beams, which it is sought to maximize (constructive interference).

A first stage acts on the delay $R_{12}$ between the two elementary beams F1 and F2 induced by the distortion, this allowing an absolute phase compensation to be achieved, independently of the wavelength, as explained below. The elementary device 15 comprises to this end a delay line DL placed on one of the paths of the elementary beams, path of F2 in the example, which is configured to induce a variable delay on this path.

A second stage acts on the amplitude difference between the two beams. The elementary device 15 comprises to this end a variable coupler VC comprising a first 2×2 combiner Comb, a phase modulator PS and a second 2×2 combiner Comb', in a Mach-Zehnder-interferometer or MZI architecture comprising 2 inputs and 2 outputs. PS may be positioned on either of the 2 arms of the MZI because F1 and F2 are mixed after the first combiner. As illustrated in FIG. 3, the inputs of the first combiner Comb are the 2 elementary beams, one of which has been delayed by the delay line. The phase modulator is placed on one of the 2 outputs of Comb.

The second combiner Comb' has a main output that forms the output Out of the elementary device 15 and to which the output beam is delivered, and a complementary output that delivers a beam that is complementary to the output beam.

A control detector Det is connected to the complementary output Sc. The signal of the control detector decreases to zero when the coupling coefficient of the variable coupler VC compensates for the intensity ratio $\rho_2/\rho_1$ and when the delay line DL compensates for the delay between the two beams, i.e. the absolute phase shift between channels 1 and 2.

Thus, the detector Det generates, from the complementary beam, an error signal ε that decreases to zero when the phase modulator PS is configured to apply a phase difference that equalizes the respective intensities of F1 and F2, and when the delay line DL is configured to apply a delay that compensates for the delay $R_{12}$ between F1 and F2.

Lastly, a feedback loop BA is configured to determine, from the error signal ε, the delay to be applied via the delay line and the phase difference to be applied via the phase modulator. The detector/feedback loop together act on DL and PS in order to minimize the complementary signal and therefore maximize the output signal.

The fact of acting on the delay between the two beams F1 and F2 allows a coherent recombination that is independent of wavelength to be achieved.

Figure 1:
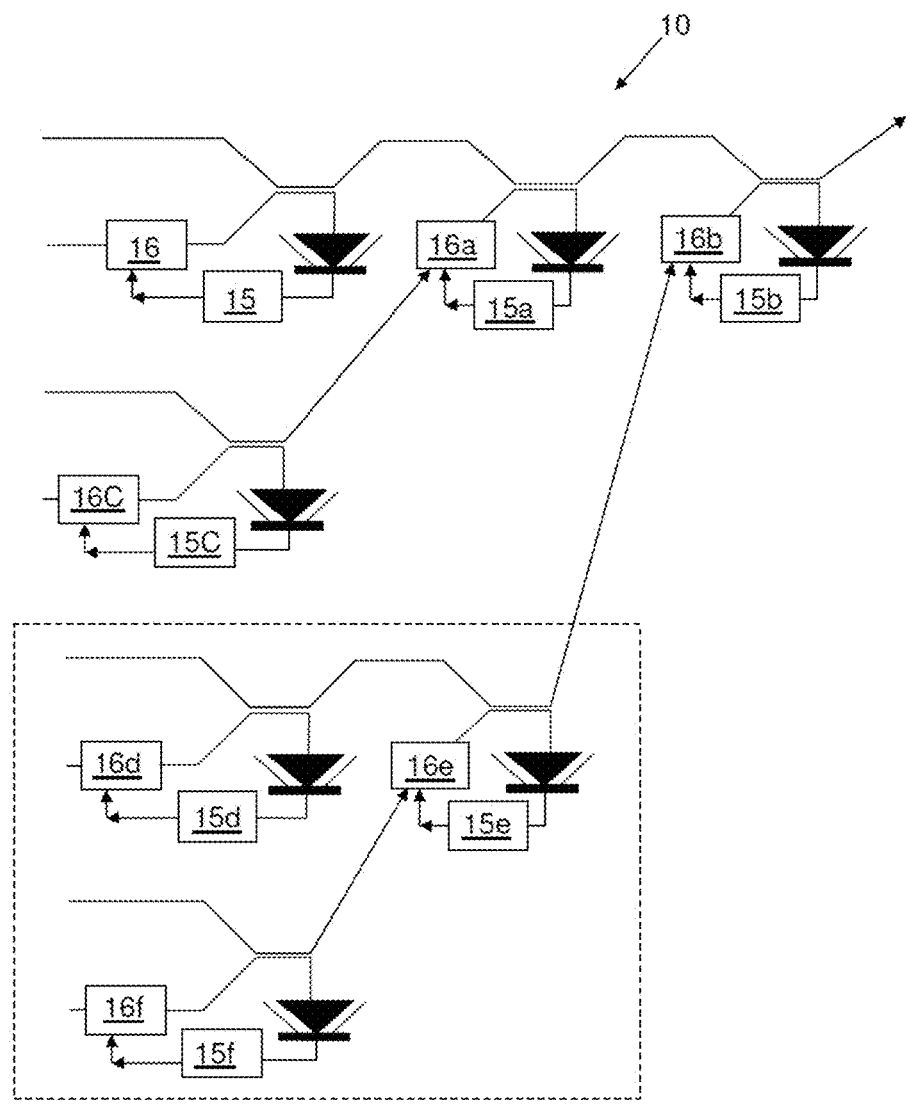
FIG. 1, which has already been described, illustrates a receiving system based on coherent recombination of mode/elementary beams according to the prior art.
Figure 2:
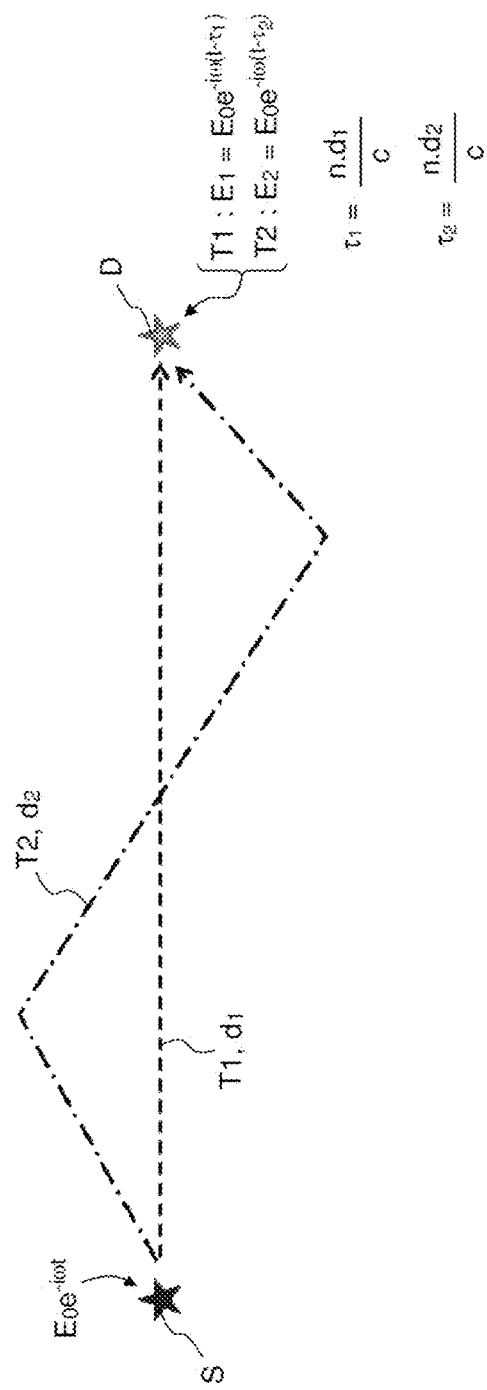
FIG. 2, which has already been described, illustrates a situation in which a field E0 is emitted from a point source S, and follows 2 different paths T1 and T2 to reach a detector D.

Returning to the situation of FIG. 2, in the case of a compensation by a delay element of the fields issued from the paths T1 and T2, the expression for the field received by the detector is:

$$E_{DET}=E_0(t-\tau_1-\tau) \times e^{-i\varphi}+E_0(t-\tau_2)$$

where τ is an adjustable delay.
The signal $i_{DET}$ at the frequency ω now equals:

$$i_{DET}(\omega) = [\vec{E_0} e^{-i\omega(t-\tau_1-\tau)} + \vec{E_0} e^{-i\omega(t-\tau_2)}] \times c.c.$$

-continued $$= 2\widetilde{E_0}\widetilde{E_0}^* \times \left(1 + \frac{\cos[\omega(\tau_1 - \tau_2 + \tau)]}{2}\right)$$

To maximize the received signal the following condition must by now be met:

cos[ω(τ₁−τ₂+τ)]=1 namely

τ=τ₂−τ₁

It may be seen that this time the optimization condition no longer depends on the optical frequency, this allowing the received signal to be optimized whatever the frequency of the laser, and therefore a fortiori for a wideband and/or WDM signal or for 2 emitting/receiving lasers of potentially very different wavelengths.

As regards the precision of the delay compensation, in telecommunications the delay must be compensated for with a precision, referred to as the residual delay δτ (delay remaining after the compensation), better than or equal to a fraction of the symbol duration, in order not to jam the transmitted signal, the symbol duration being defined by the duration of one bit of information, or the inverse of the modulation frequency (valid for a single carrier wavelength).

For a mono-λ (single-channel) signal modulated at 10 GHz, the symbol duration is equal to 100 ps. A maximum residual delay typically of 10 ps (1/10 of the symbol time) corresponding to a phase shift of 2000×λ at λ=1550 nm (wavelength typically used in telecoms) is therefore required. This delay, expressed in multiples of wavelength, is obtained by computing the distance travelled by light at the speed c=3×10⁸ m·s⁻¹ in a time of 10 ps, and expressing it is a multiple of the wavelength, i.e.:

$$\varphi = \frac{c\Delta t}{\lambda}.$$

In practice, there are 2 types of delay, fixed or static delays, which are due to differences in fibre length between the various channels for example, and dynamic delays, which are due to atmospheric perturbations for example.

The differential delays due to atmospheric propagation (dynamic distortion) are very much smaller than 2000×λ, and a static compensation of the structural delays of the system (fibre lengths, etc.) is sufficient.

In contrast, the differences in length between the fibres correspond to several thousand or even tens of thousands of λ, and it is therefore necessary to correct them. However, they do not move and therefore a static compensation once and for all is sufficient.

Thus, in the mono-λ case, there is no need to use servocontrol or feedback loops for phase adjustment, a calibration being sufficient.

When a plurality of wavelengths are in play, the tolerance to the residual delay between the channels is drastically decreased, as the recombination is an interferometric process that requires a perfect equalization of the delays if it is to function independently of wavelength (condition of white-light interference).

Figure 4:
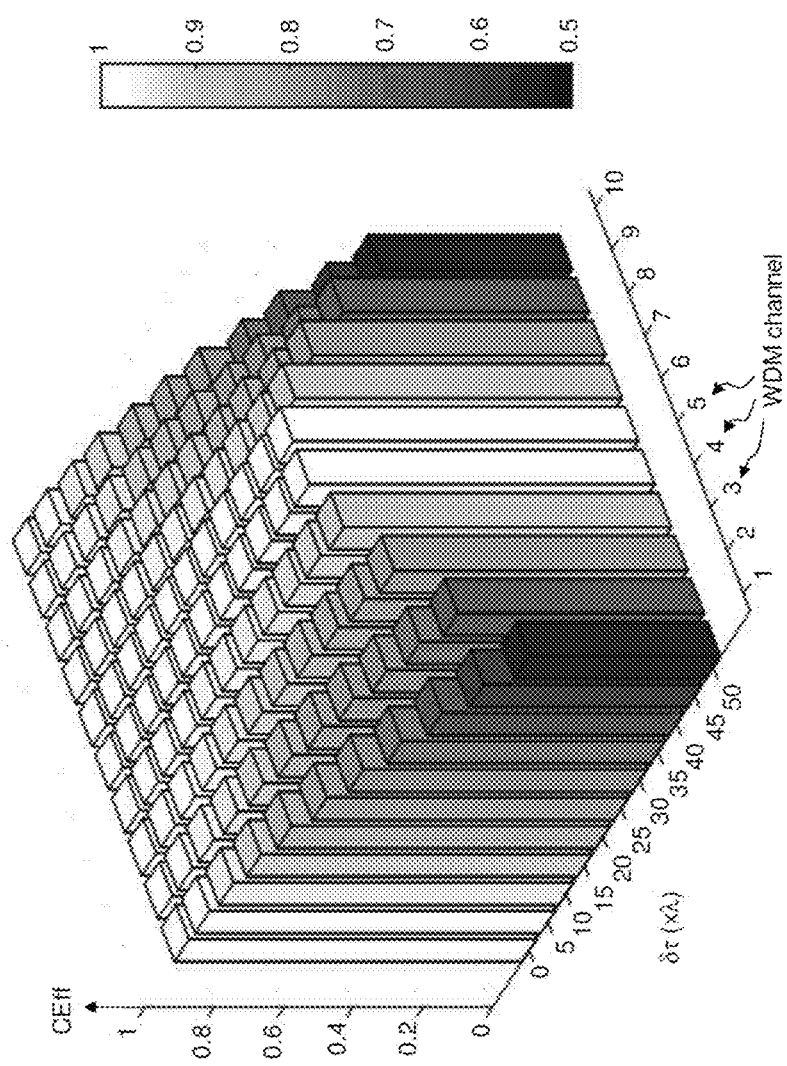
FIG. 4 illustrates the optimal-combination effectiveness per WDM channel as a function of the value of the residual delay expressed in multiples of the wavelength.

In practice, this tolerance depends on the extent of the WDM spectrum. Thus, for a typical case of 10 WDM channels (1 to 10) spaced apart by 200 GHz, FIG. 4 shows the optimal-combination effectiveness CEff per WDM channel (obtained with a minimization of the error signal) as a function of the value of the residual delay δτ expressed in multiples of λ, with λ=1.55 μm. It may be seen that a residual delay δτ of 10×λ leads to an average recombination effectiveness higher than 99% (average over all of the WDM channels).

In contrast, when the residual delay is 35×λ, the average recombination effectiveness drops to 90% (80% for the channels at the ends of the spectrum). To obtain 90% over all of the spectrum, it is necessary to equalize the delays to better than 20×λ. It is therefore necessary to dynamically correct fluctuations in delay between the channels to be recombined, since the delay variations due to the propagation through the atmosphere, to thermal effects, mechanical defects or other effects are typically larger than 20λ. A device for dynamically recombining with correction of the delays such as described in this invention is then necessary.

A residual delay of about 20λ is compatible with variable delay lines produced with conventional components such as fibres (fibre stretched by a piezoelectric module) or mirrors (mirror on a piezoelectric chip).

Typically a fibre wound around a piezoelectric chip allows dynamic delays to be corrected: bandwidth of 10 kHz, 1/20 micron or better precision, and >100λ excursion.

The signal received by the control detector decreases to zero only when the condition that the delays be exactly compensated for is met (white-light interference) and therefore delivers an error signal good for a dynamic servocontrol.

Figure 5:
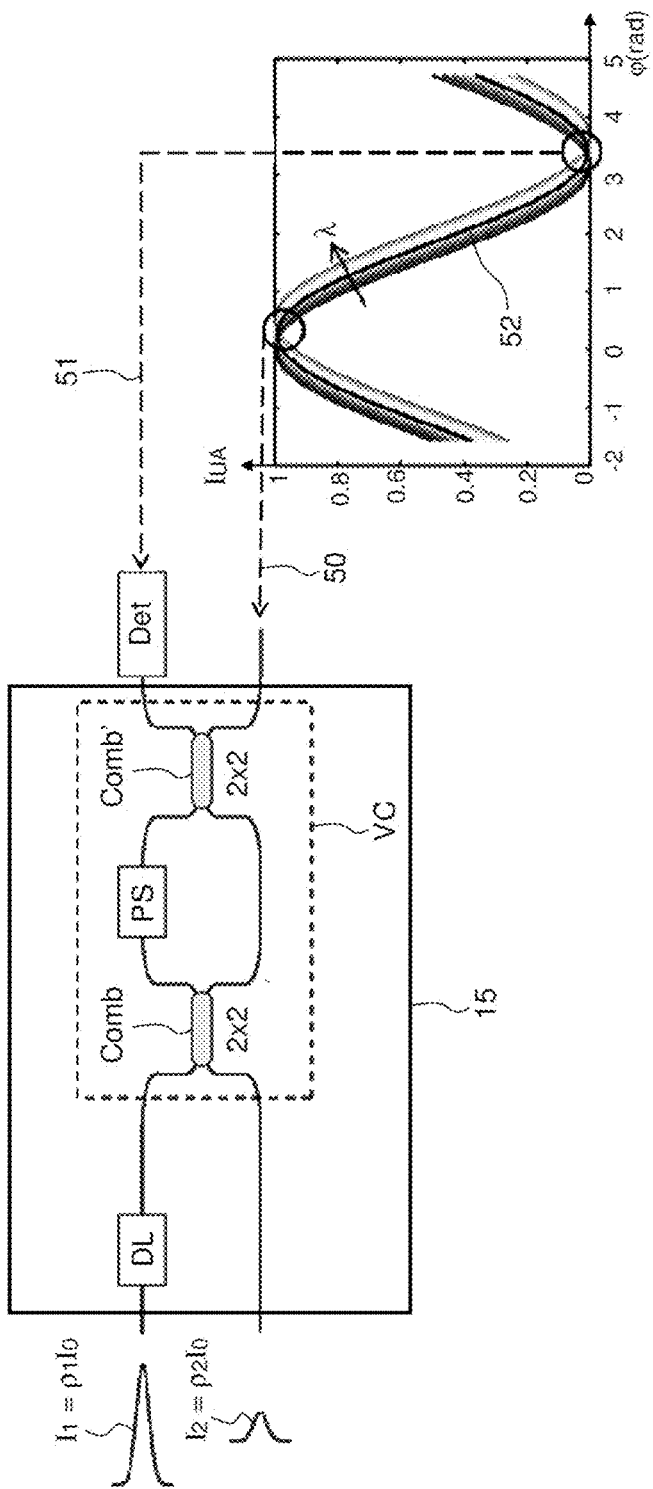
FIG. 5 illustrates the intensity detected by the detector as a function of phase and for each channel to be optimized, in the case of a residual delay equal to 10×λ.

FIG. 5 illustrates the intensity I detected by the detector Det as a function of the phase applied by PS and for each channel to be optimized, in the case of a residual delay δτ of 10×λ (i.e. the delay line DL compensates for the difference in delay between the two channels with a residual error δτ of 10λ). It is the minimum 51 of the intensity that allows the adjustment of the servocontrol (error signal ε), whereas the maximum 50 is delivered to the output of the device. The curve 52 illustrates the intensity averaged over the 10 channels.

It may be seen that a residual delay of 10λ is acceptable for the device.

Figure 6:
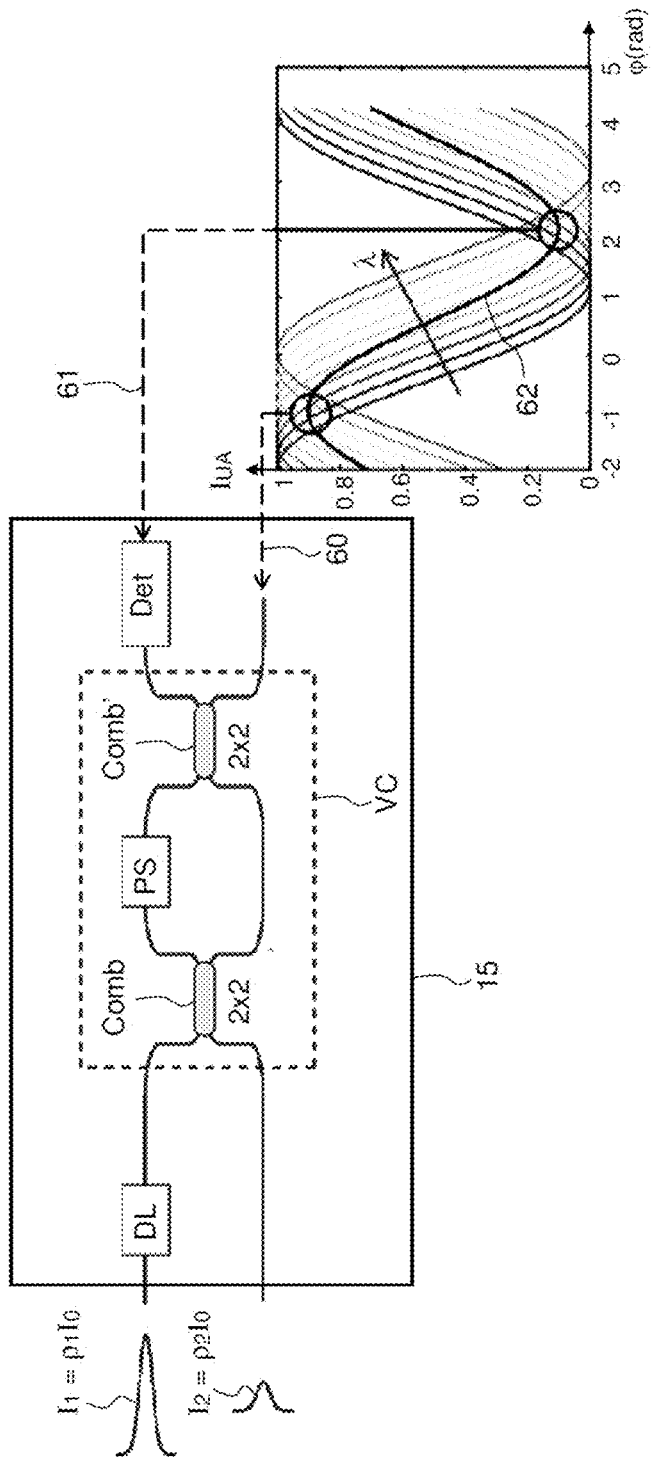
FIG. 6 illustrates the intensity detected by the detector as a function of phase and each channel to be optimized, in the case of a residual delay equal to 35×λ.

FIG. 6 illustrates the intensity I detected by the detector Det for each channel in the case of a residual delay δτ of 35×λ. The minimum 61 of the intensity allows the adjustment of the servocontrol, whereas the maximum 60 is delivered to the output of the device. The curve 62 illustrates the intensity averaged over the 10 channels. The recombination effectiveness has dropped, clearly showing that a residual delay of 35λ leads to a degraded device error signal.

Figure 7:
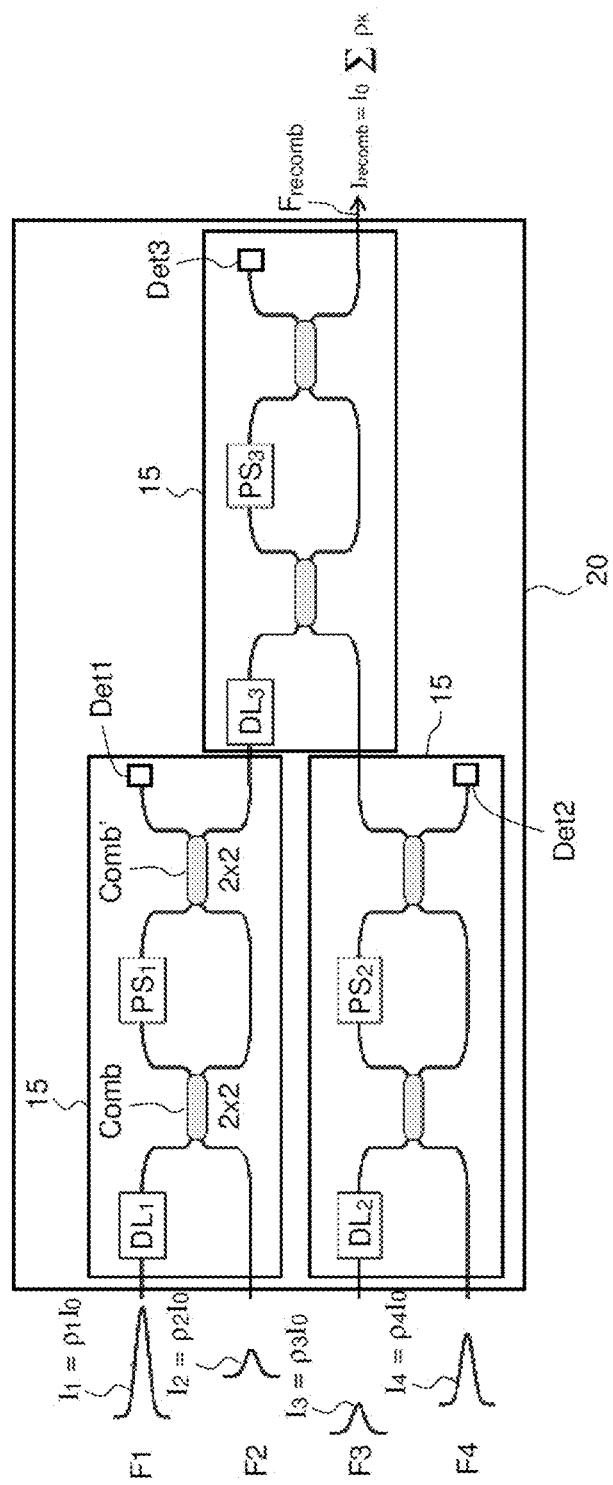
FIG. 7 illustrates a coherently recombining device according to the invention comprising a plurality of elementary devices arranged in cascade and allowing a single recombined beam to be obtained.

The elementary devices 15 are intended to be arranged in cascade so as to form a coherently recombining device 20 allowing a single recombined beam Frecomb to be obtained, such as illustrated in FIG. 7.

The distorted incident beam Fid is considered to be sampled into N elementary beams F1, F2, FN, where N is a strictly positive even integer.

FIG. 7 illustrates a device 20 for the case N=4 (easily generalizable to a higher number) consisting of three elementary devices 15. The incident beams are recombined 2 by 2.

The variable delay lines DL1 and DL2 firstly allow the optical delays (absolute phases) between the beams F1 and F2 on the one hand, and F3 and F4 on the other hand, to be adjusted.

Secondly, 2 tunable couplers each consisting in this example of a Mach-Zehnder interferometer (MZI) with an adjustable phase shift (PS1 or PS2) compensate for the intensity ratio between 1 and 2 (PS1) and 3 and 4 (PS2).

An intensity detector (Det1, Det2) is placed on the complementary output of the MZI in order to generate an error signal for the adjustment of DL1/PS1 and DL2/PS2.

The way in which the outputs of the 2 MZI are combined is the same, a delay line DL3 being provided to adjust the delays, followed by another MZI for combining and adjusting the intensity ratios.

For incident intensities $I_k$ equal to $I_k=\rho_k I_0$, a beam $F_{recomb}$ having a combined intensity equal to $I_{recomb}=I_0 \Sigma \rho_k$ is output from the device when the signals delivered to the control detectors are zero.

Figure 8:
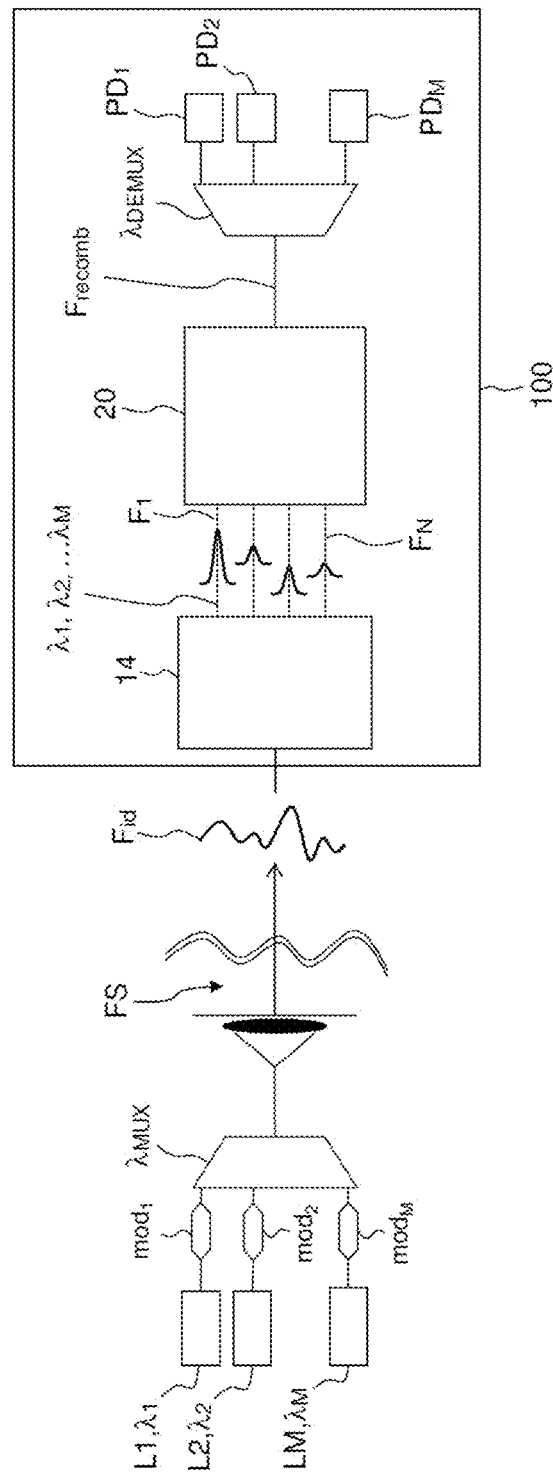
FIG. 8 illustrates a receiving system according to the invention using a coherently recombining device.

According to another aspect, the invention also relates to a receiving system 100 such as illustrated in FIG. 8 using a device 20 according to the invention.

This multi-λ system is based on decomposition of the aberrant incident wavefront into a multitude of sub-beams of planar wavefronts (spatial demultiplexing) then use of the device 20 to implement the coherent combination technique, with a view to getting the sub-beams back in phase and maximizing the collected optical power and therefore the link budget, whatever the wavelength.

The receiving system 100 of FIG. 8 illustrates the case of a WDM link in which emission-end a beam consisting of M multiplexed wavelengths $\lambda_1, \lambda_2, \ldots \lambda_M$, each carrying a modulation signal (modulators mod1, mod2 . . . and multiplexer λMUX), is emitted into free space. After propagation through the atmosphere FS the beam has an amplitude and phase that are greatly distorted, forming on reception the incident beam Fid.

The system 100 firstly comprises a device 14 for spatially demultiplexing the incident beam Fid, configured to sample Fid into N elementary beams. The elementary beams have different amplitudes and different phases. Preferably, they are diffraction limited in order to allow them to be easily coupled to a single-mode fibre or integrated photonic circuit.

A plurality of devices may perform the function of spatially demultiplexing the aberrant beam.

A first spatially demultiplexing device 14 comprises a matrix array of micro-lenses that pixelates the incident beam, by spatially sampling the aberrant beam. The spatial sampling pitch (size of the pixels) is chosen so that each elementary beam is diffraction limited. A quite small pixel size and therefore a high number of elementary beams may prove to be necessary.

A second device comprises a multi-aperture telescope, with a correction of tip/tilt type of each elementary beam.

Lastly, a third device is configured to carry out a decomposition into N spatial modes using N phase plates. Assuming that the aberrant beam is decomposed into a basis of high spatial modes, the phase plates are then designed to convert these high modes into Gaussian modes via free propagation and passage through the phase plates.

The receiving system 100 also comprises a device 20 for coherently recombining the N elementary beams, such as the device described above. It is here a question of compensating for the optical delays and the variations in amplitudes between the N elementary beams before they are added optically (coherent summation) and of forming the beam Frecomb. The device 20 therefore concentrates all the optical energy on a single detector and therefore allows an improvement in signal-to-noise ratio compared to the incoherent approach.

The sum beam Frecomb is then demultiplexed by a wavelength demultiplexing device λDEMUX so as to form M beams at M wavelengths, each forming a channel for conveying information. Next, the M beams are each transmitted to M detectors $PD_1, PD_2, \ldots PD_M$ (for M WDM channels)

A receiving system that employs coherent recombination and that has a very good recombination effectiveness over a wide spectral band or frequency comb (WDM architecture) is thus obtained.

Moreover, such a system is compatible with integrated photonic technologies, it being possible to integrate into a photonic chip the functions of the 2×2 switches (including the control receivers (detectors), and optionally the WDM receivers) and a demultiplexer (cascaded asymmetric MZI or planar phased array for example).

An integrated-photonic approach makes the system simpler and less expensive than an adaptive-optic approach.

Figure 9:
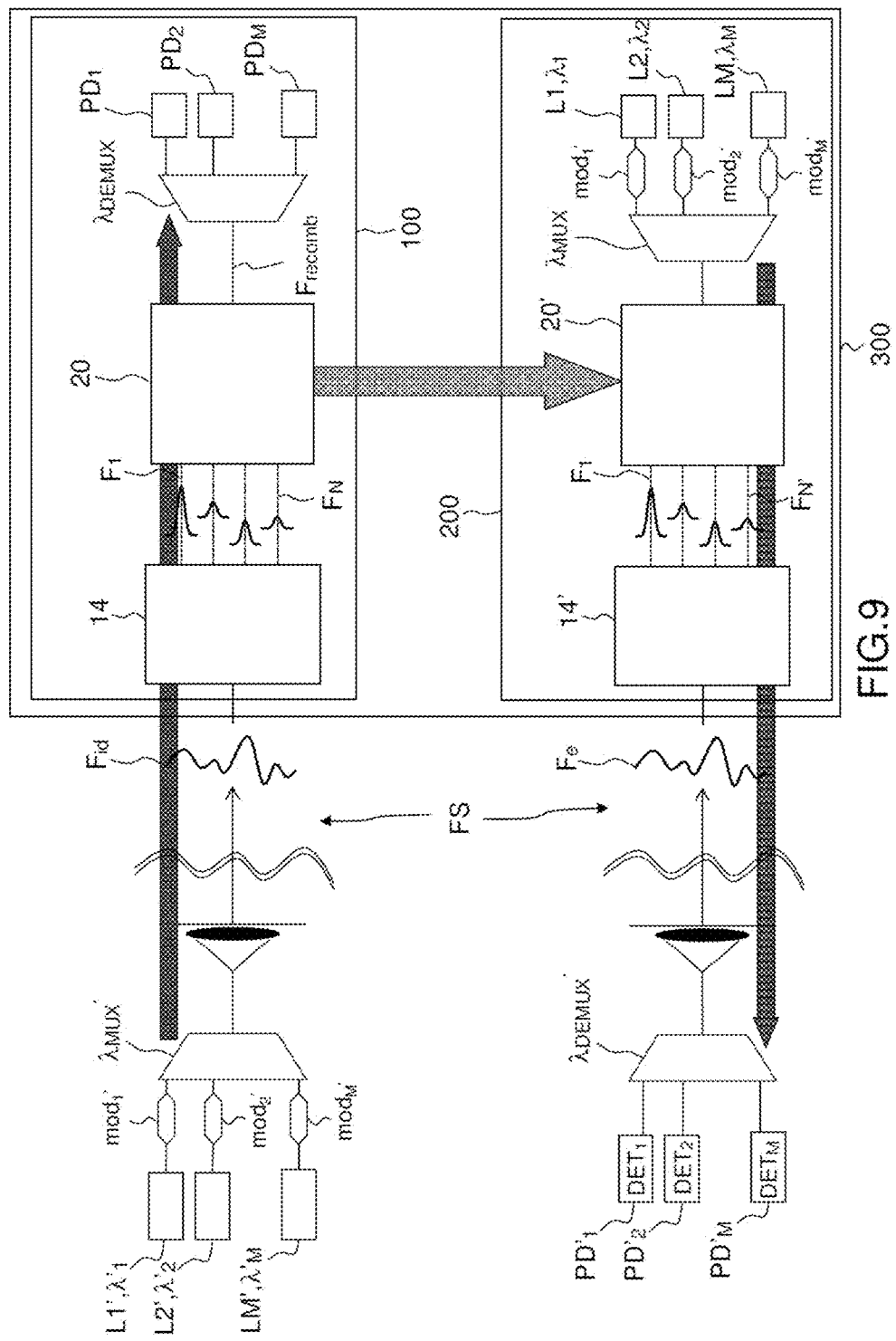
FIG. 9 illustrates a first embodiment of a receiving/emitting system according to the invention.
Figure 10:
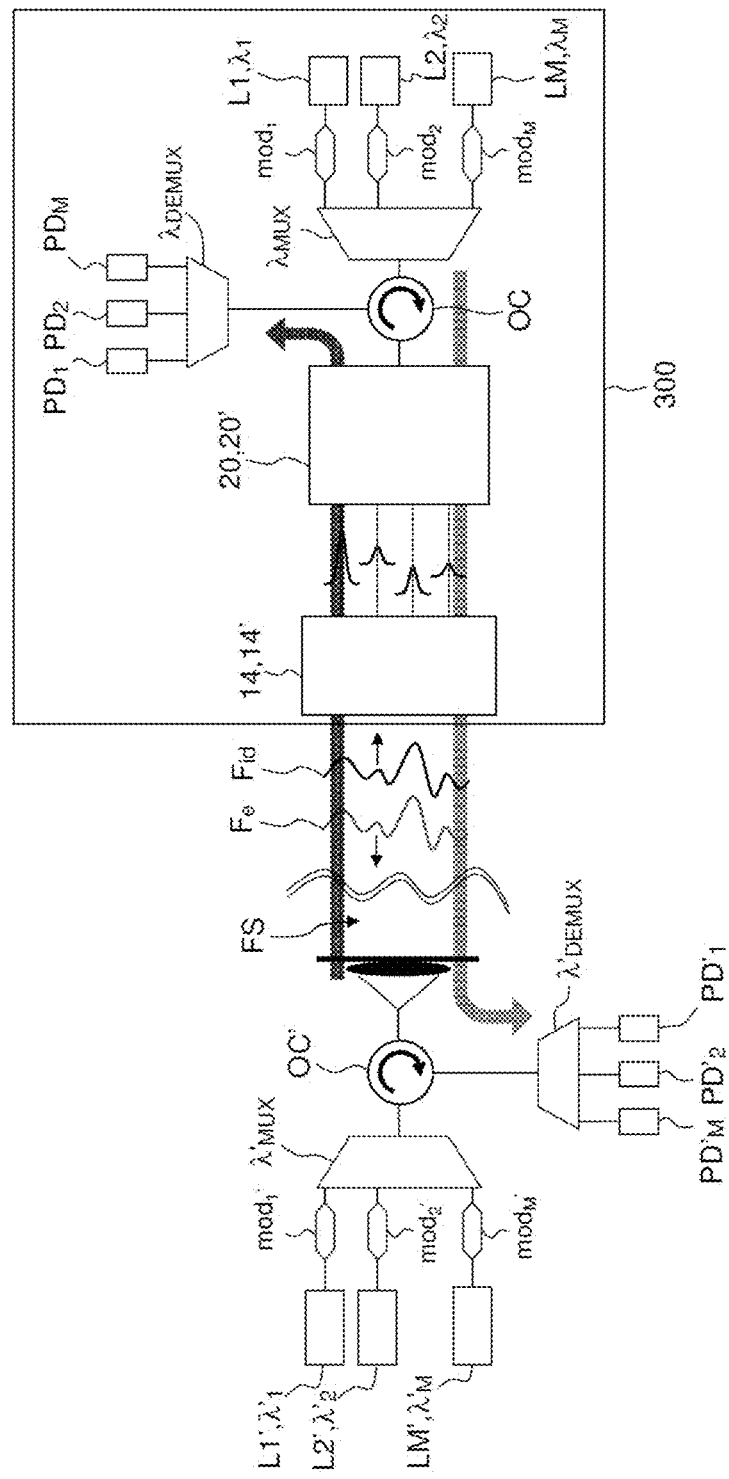
FIG. 10 illustrates a second embodiment of a receiving/emitting system according to the invention.

According to another aspect, the invention also relates to a receiving/emitting system 300 comprising a receiving system 100 such as described above and an emitting system 200, two embodiments thereof being illustrated in FIGS. 9 and 10.

The emitting system comprises M laser sources $L_1, L_2, \ldots L_M$ and M associated modulators $mod_1, mod_2, \ldots mod_M$ that are configured to generate M beams at M wavelengths, each beam forming a channel for conveying information, and a wavelength multiplexing device λMUX so as to form a multi-wavelength beam.

The system 200 also comprises a device 20' for coherently splitting the multi-wavelength beam into N elementary emission beams $F_1', F_2', \ldots F_N'$, which device is substantially identical to the coherently recombining device 20, but used in the inverse direction, each delay line and each phase modulator therefore respectively applying a delay and a phase difference that is the opposite to those determined by each feedback loop of the coherently recombining device 20 of the receiving system 100, the N elementary emission beams therefore corresponding to N beams $F_1', \ldots F_N'$ that are respectively the conjugates of the N initial elementary beams.

Lastly, the system 200 comprises a spatially multiplexing device 14' that is substantially identical to the spatially demultiplexing device 14 but used in the inverse direction so as to convert the N elementary emission beams F1', . . . FN' into an emitted beam Fe corresponding to the conjugate of the incident beam Fid, so as to pre-compensate for the distortion.

In other words, the amplitude and delay weightings determined for the reception-end coherent combination are here used to apply, to the N elementary emission beams, the weighting law that will allow the atmospheric perturbations to be pre-compensated for in the inverse direction.

In the embodiment of FIG. 9, the systems 100 and 200 each have different devices 20/20' and 14/14'.

In the embodiment of FIG. 10, the coherently recombining device 20 and the coherently splitting device 20' are one and the same and the spatially demultiplexing device 14 and the spatially multiplexing device 14' are one and the same.

The wavelength demultiplexing device λDEMUX and the M detectors $PD_1, PD_2, PD_M$ on the one hand, and the M laser sources $L_1, L_2, \ldots L_M$, the M associated modulators $mod_1, mod_2, mod_M$ and the wavelength multiplexing device λMUX on the other hand, are then coupled to the coherently recombining/splitting device by a circulator OC.

In principle, the system 200 functions bidirectionally, i.e. it is able to emit and receive at the same time. However, at the component level, the emitted signal is much more intense than the received signal, while the device is configured to optimize the received signal. It is thus possible for parasitic reflections of the emission to disrupt optimization of the reception and therefore the adjustment of the component. In which case, the system is made to operate alternately in emitting/receiving mode.

The invention claimed is:

1. An elementary device for coherently recombining a first elementary beam (F1) and a second elementary beam (F2) that are obtained by sampling an incident beam (Fid) having undergone a distortion and the spectrum of which comprises M wavelengths ($\lambda_1, \lambda_2, \ldots \lambda_M$) each forming a channel for conveying information, said distortion having induced a delay ($R_{12}$) between said first and second elementary beams, the elementary device comprising:
   a first input (Input1) and a second input (Input2), into which are respectively injected the first elementary beam (F1) and the second elementary beam (F2) to be recombined,
   an output (Out) that delivers an output beam corresponding to the coherent recombination of the first and second elementary beams,
   a delay line (DL) placed on one of the paths of said elementary beams and configured to induce a variable delay on said path,
   a variable coupler (VC) comprising a first 2×2 combiner (Comb), a phase modulator (PS) and a second 2×2 combiner (Comb'),
   the second combiner having a main output that forms the output (Out) of the elementary device and that delivers said output beam and a complementary output (Sc) that delivers a beam that is complementary to the output beam,
   a control detector (Det) connected to the complementary output (Sc) and configured to generate, from the complementary beam, an error signal ($\varepsilon$) that decreases to zero when the phase modulator (PS) is configured to apply a phase difference that equalizes the intensities of the first and second elementary beams, and when the delay line (DL) is configured to apply a delay that compensates for said delay ($R_{12}$) between said first and second elementary beams,
   a feedback loop (BA) configured to determine, from the error signal, the delay and the phase difference to be applied.

2. The device for coherently recombining N elementary beams ($F_1, F_2, \ldots F_N$) obtained by sampling said distorted beam (Fd), where N is a strictly positive even integer, comprising a plurality of elementary devices according to claim 1 arranged in cascade so as to obtain a single recombined beam (Frecomb).

3. A receiving system comprising:
   a device for spatially demultiplexing the incident beam (Fid), configured to sample said incident beam into N elementary beams,
   a device for coherently recombining the N elementary beams according to claim 2,
   a device ($\lambda$DEMUX) for wavelength demultiplexing so as to form M beams that M wavelengths each forming one channel for conveying information,
M detectors ($PD_1, PD_2, PD_M$) associated with said M beams.

4. The receiving system according to claim 3, wherein the elementary beams are diffraction limited.

5. The receiving system according to claim 3, wherein the spatially demultiplexing device comprises a matrix array of micro-lenses that is configured to spatially sample the incident beam.

6. The receiving system according to claim 3, wherein the spatially demultiplexing device comprises a multi-aperture telescope.

7. The receiving system according to claim 3, wherein the spatially demultiplexing device comprises N phase plates configured to carry out a decomposition into N spatial modes.

8. A receiving/emitting system comprising a receiving system comprising:
   a device for spatially demultiplexing the incident beam (Fid), configured to sample said incident beam into N elementary beams,
   a device for coherently recombining the N elementary beams according to claim 2,
   a device ($\lambda$DEMUX) for wavelength demultiplexing so as to form M beams that M wavelengths each forming one channel for conveying information,
M detectors ($PD_1, PD_2, PD_M$) associated with said M beams and further comprising
an emitting system, comprising:
   M laser sources ($L_1, L_2, \ldots L_M$) and M associated modulators ($mod_1, mod_2, mod_M$), configured to generate M beams at M wavelengths,
   a device ($\lambda$MUX) for wavelength multiplexing so as to form a multi-wavelength beam,
   a device for coherently splitting the multi-wavelength beam into N elementary emission beams ($F'_1, F'_2, \ldots F'_N$), which is substantially identical to the coherently recombining device according to claim 2, but used in the inverse direction and so that each delay line and each phase modulator respectively applies the opposite delay and the opposite phase difference to those determined by each feedback loop of the coherently recombining device of the receiving system, so that the N elementary emission beams ($F_1', \ldots F_N'$) respectively correspond to N beams that are the conjugates of the N initial elementary beams,
   a spatially multiplexing device that is substantially identical to the spatially demultiplexing device but used in inverse direction so as to convert the N elementary emission beams (F1', ... FN') into an emitted beam (Fe) corresponding to the conjugate of the incident beam (Fid), so as to pre-compensate for said distortion.

9. The receiving/emitting system according to the claim 8, wherein:
   the coherently recombining device and the coherently splitting device are one and the same,
   the spatially demultiplexing device and the spatially multiplexing device are one and the same,
   the wavelength demultiplexing device ($\lambda$DEMUX) and the M detectors ($PD_1, PD_2, PD_M$) on the one hand, and the M laser sources ($L_1, L_2, \ldots L_M$), the M associated modulators ($mod_1, mod_2, mod_M$) and the wavelength multiplexing device ($\lambda$MUX) on the other hand, are coupled to the coherently recombining/splitting device by a circulator (OC),
   the system furthermore being configured to be used to alternately receive and emit.

* * * * *